United States Patent [11] 3,604,839

[72] Inventor Sotirios Constantine Kitsopoulos
Waedenswil, Switzerland
[21] Appl. No. 12,630
[22] Filed Feb. 19, 1970
[45] Patented Sept. 14, 1971
[73] Assignee Bell Telephone Laboratories, Incorporated
Murray Hill, N.J.

[54] FIELD-SEQUENTIAL COLOR TELEVISION APPARATUS EMPLOYING COLOR FILTER WHEEL AND TWO CAMERA TUBES
11 Claims, 8 Drawing Figs.

[52] U.S. Cl. .......... 178/5.4 CF, 178/5.4 R
[51] Int. Cl. .......... H04n 9/34
[50] Field of Search .......... 178/5.4 CF; 352/66

[56] References Cited
UNITED STATES PATENTS 2,329,194 9/1943 Goldmark .......... 178/5.4

*Primary Examiner*—Richard Murray
*Assistant Examiner*—Peter M. Pecori
*Attorneys*—R. J. Guenther and William L. Keefauver

ABSTRACT: In a three-color, field-sequential television system, color crosstalk is reduced and signal-to-noise ratio increased by using two monochrome television camera tubes in optical correspondence with a three-color filter wheel. The physical relationship of the camera tubes and the filter wheel allows the tubes to be scanned in alternate time periods, thereby extending exposure time relative to scanning time. The video signals from the two tubes are combined to produce a three-color, field-sequential television signal.

INVENTOR
S.C. KITSOPOULOS
BY Howard C. Murphy
ATTORNEY

FIELD-SEQUENTIAL COLOR TELEVISION APPARATUS EMPLOYING COLOR FILTER WHEEL AND TWO CAMERA TUBES

BACKGROUND OF THE INVENTION

1. Field of the Invention

This invention relates to three-color, field-sequential television systems and, more particularly, to a television system using two camera tubs and an optical filter wheel.

2. Description of the Prior Art

Prior art three-color, field-sequential television systems are generally discussed in Color Television Standards, edited by Donald G. Fink, McGraw-Hill Book Company, Inc., 1955, pages 5 through 10. Basically, these systems utilize a transmitter camera comprising a television camera tube situated behind a rotating three-color filter wheel and a receiver comprising a cathode ray tube (CRT) situated behind a filter wheel similar to and synchronized with the transmitter camera filter wheel. More detailed discussion of such systems is found in U.S. Pat. No. 2,435,962, issued to P. C. Goldmark on Feb. 17, 1948, and U.S. Pat. No. 2,317,989, issued to P. C. Goldmark on May 4, 1943.

All of these prior art schemes have in common the limitations of using a single television camera tube to generate signals representative of all the optical information in the image to be televised. Over the course of the exposure time of a typical television camera tube, an electrical charge pattern builds up on the face of the tube proportional to the intensity of light in the optical image focused on the face of the tube. Field signals are developed by scanning the face of the tube with a controlled electron beam. Fields in each of three primary colors must be produced in a rapid succession to prevent "-flicker" in the display. On the other hand, resolution deteriorates and noise increases as the filed rate increases because the charge pattern on the face of the tube has less time to develop before the tube is scanned.

It is therefore an object of this invention to extend camera tube exposure time for a given field rate in a three-color, field-sequential television system.

It is another object of this invention to reduce color cross-talk and increase signal-to-noise ratio in a three-color, field-sequential television system.

SUMMARY OF THE INVENTION

These and other objects of this invention are accomplished, in accordance with the principles of the invention, by utilizing two television camera tubes in optical correspondence with a three-color filter wheel, thereby enabling the tubes to be simultaneously exposed to filters of predetermined different colors. More particularly the instantaneous position and the speed of the filter wheel are synchronized with tube scanning such that the scanning of each horizontal line of each tube takes place when an interface between two color filter segments of the filter wheel is coincident with the portion of the optical image to be immediately scanned. Furthermore, the camera tubes are spatially positioned with respect to the color filter wheel segments so that a color filter interface is presented on only one tube at any time. Accordingly, field scanning signals may be applied to the camera tubes in alternate field scanning intervals. The multiplexed, i.e., combined, output of the two tubes is a three-color, field-sequential video signal. Advantageously, the exposure time of a tube to an image, filtered by any of the three primary colors, is twice the field scanning time. Accordingly, the above-described limitations of single-camera, three-color, field-sequential system, wherein the exposure time of any line is equal to the field scanning time, are overcome.

Further features and objects of this invention, its nature, and various advantages, will be more apparent upon consideration of the attached drawings and the following detailed description of the drawings.

DETAILED DESCRIPTION

Figure 1:
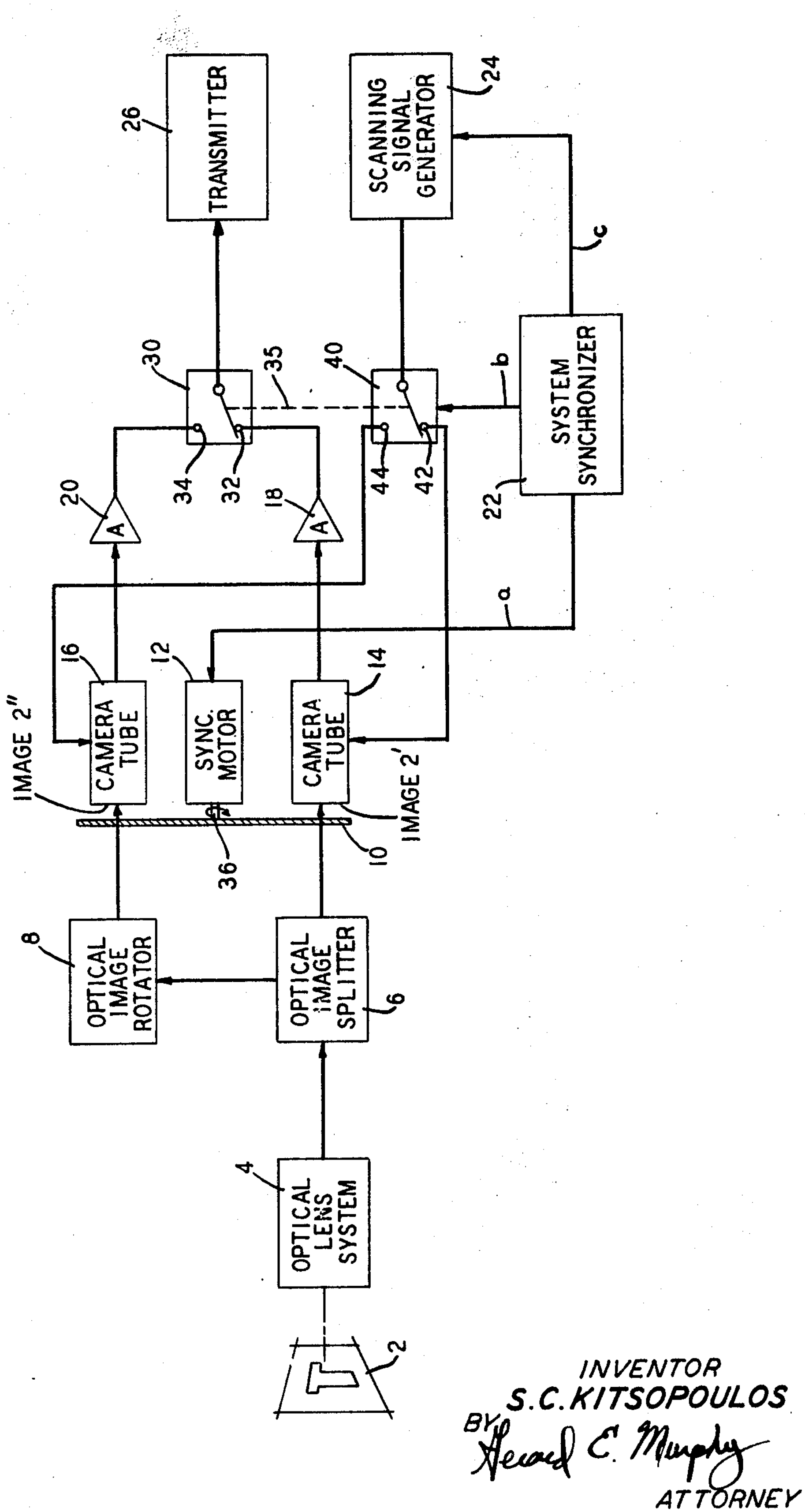
FIG. 1 is a block diagram of the color television system of this invention.

Optical lens system 4 of FIG. 1, focuses light reflected from optical image 2 onto the face of camera tube 14, the image first passing through optical image splitter 6 and a color filter segment in filter wheel 10, which may have the configuration shown in FIG. 2. Optical image splitter 6, for example, a half-silvered mirror, diverts approximately half of the optical energy in the image to optical image rotator 8, for example, a mirror and an inverting lens. Image rotator 8 serves to focus optical image 2'' through another color filter segment of filter wheel 10 onto the face of camera tube 16 in inverted relationship to optical image 2', focused on the face of camera tube 14. Suitable for use as camera tubes are any commercially available monochrome camera tubes; for example, tubes of the plumbicon, vidicon, or image-orthicon variety have been found satisfactory. Optical lens system 4 is, of course, conventional.

Figure 2B:
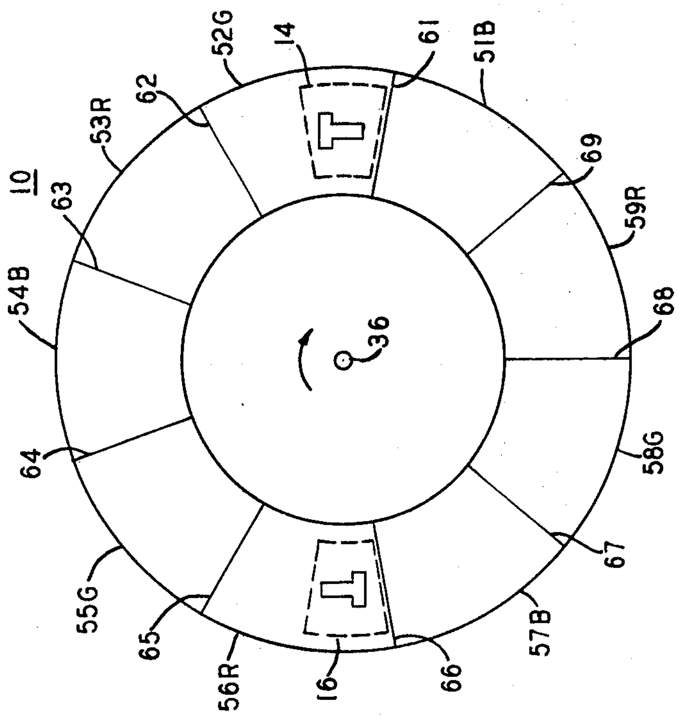
FIG. 2B shows the relative position of the filter wheel and camera apparatus of FIG. 2A after one camera field scanning interval has elapsed.
Figure 2A:
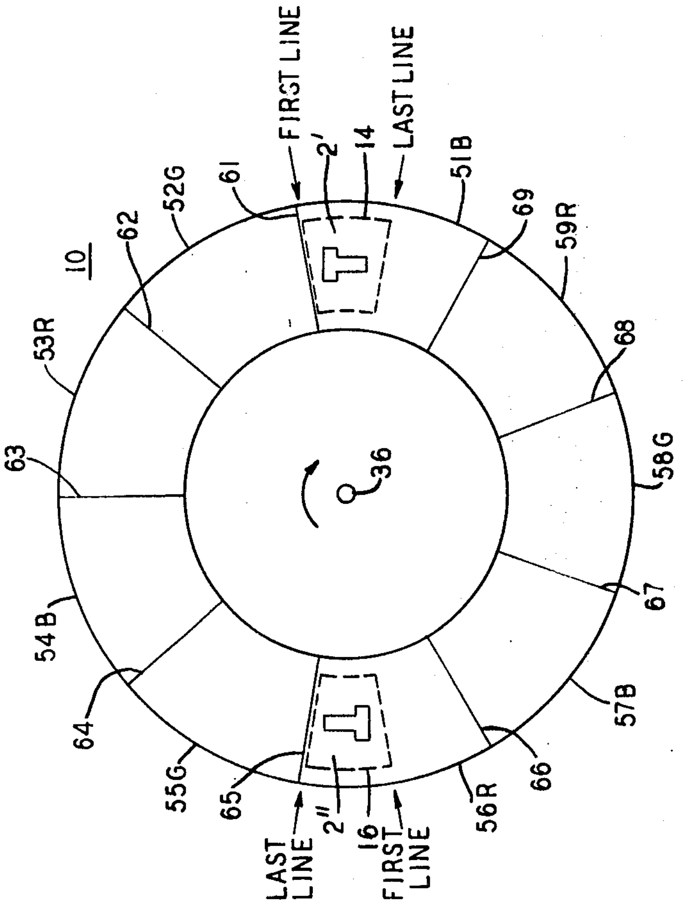
FIG. 2A depicts a three-color filter wheel and two camera tubes for use in the system of FIG. 1.

Color filter wheel 10 comprises a plurality of adjoining translucent color filter segments (for example, segments 51B, 52G, and 53R) in each of three primary colors (for example, blue, green, and red, respectively) arranged sequentially about the periphery of the wheel as shown in FIG. 2A. In FIGS. 2A and 2B, the outlines of the faces of camera tubes 14 and 16 are shown in broken lines to illustrate how they may be spatially located relative to the segments of the filter wheel to achieve the desired optical correspondence. The outlines of the tubes have been slightly distorted to clarify the explanation of the operation of the invention of FIG. 1. Each filter segment, e.g., 51B, has as its dimension between interfaces with adjacent filter segments, e.g., 61 and 69, a distance equal to twice the desired vertical scanning dimension of a camera tube.

Figure 3:
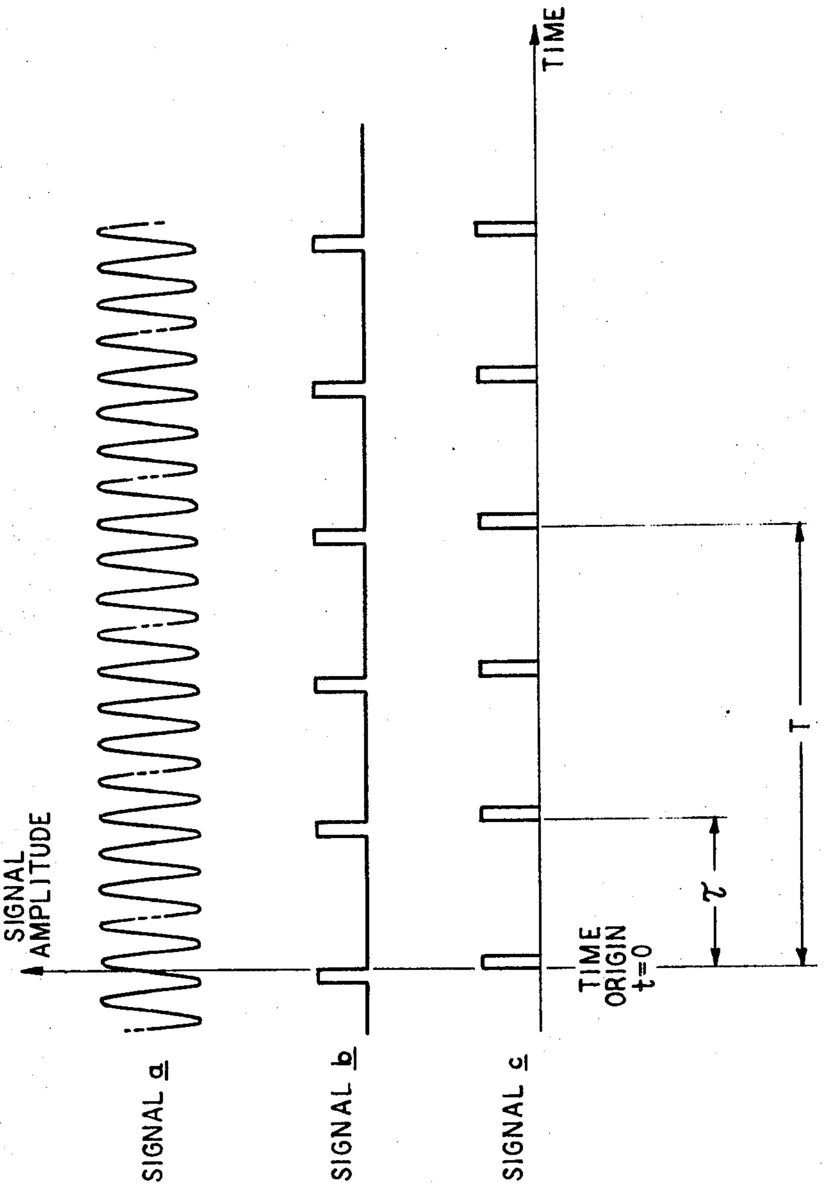
FIG. 3 is a time diagram of the signals generated by the system synchronizer of FIG. 1.

Returning to FIG. 1, color filter wheel 10 is driven by synchronous motor 12 in a clockwise direction, when viewed from apparatus 6 and 8, as indicated by the arrow about shaft 36. System synchronizer 22 generates signals *a*, *b*, and *c* depicted in FIG. 3, for synchronizing motor 12, enabling electronic switches 30 and 40, and activating scanning signal generator 24, respectively. Synchronizer 22 may, of course, be any conventional signal timing generator. Pulse train *b* leads, by a small interval of time, pulse train *c* to insure that switches 30 and 40 are activated prior to the commencement of scanning. Synchronous motor 12, responsive to signal *a*, is arranged in a well-known manner such that in one field scanning interval, $\tau$, the angular position of filter wheel 10 is changed from that shown in FIG. 2A to that shown in FIG. 2B. Scanning signal generator 24, responsive to pulse train *c*, generates the vertical and horizontal scanning signals necessary to scan the entire face of one camera tube in one field scanning interval, $\tau$, when triggered by a pulse of train *c*. Signal generator 24 may be of any well-known type. Electronic switches 30 and 40, operate together, as indicated by broken line 35, and change state responsive to the application of a pulse of signal *b*. Switch 40 therefore directs vertical and horizontal field scanning signals to camera tubes 14 and 16 in alternate field scanning intervals, $\tau$. Switch 30 allows the video output signals from the camera tube being scanned in any interval, $\tau$, to be applied to conventional transmitter apparatus 26. Since the signal developed by transmitter 26 is similar to that of prior art three-color, field-sequential television transmitters, a receiver, not shown, similar to those of prior art systems may be employed.

Considering in detail the operation of the system of FIG. 1, at any arbitrary time *t*32 0, color filter wheel 10 is in the angular position shown in FIG. 2A. Camera tube 14 is exposed to optical image 2′ filtered by blue filter segment 51B and has been exposed to that blue image since the passage of filter segment interface 69 across its face. At time *t*32 0, moreover, electronic switches 30 and 40 have just been actuated to connect terminals 32 and 42, respectively, to transmitter 26 and generator 24. Scanning signal generator 24, responsive to a pulse of signal *c*, begins generating vertical and horizontal field scanning signals. These scanning signals are directed by switch 40 to camera tube 14. Tube 14 is conventionally connected to scan from top to bottom. As a first horizontal line near the top of the face of camera tube 14 is scanned, filter segment interface 61 moves to a position approximately coincident with the portion of optical image 2′ focused on that portion of the face of tube 14 being scanned. Since, as already stated, it takes the same amount of time for filter segment interface 61 to move across the face of tube 14 as it does to scan the tube (namely, a field scanning interval, $\tau$), each horizontal line on the face of tube 14 is scanned while interface 61 is approximately coincident with the portion of image 2′ focused on that horizontal line on the face of the tube. During the time interval $0<t<\tau$, video output signals from camera tube 14, representative of the blue color components of subject image 2, are channeled by switch 30 to transmitter 26.

At time $t=\tau$, filter wheel 10 is in the position shown in FIG. 2B, the scanning of camera tube 14 has just been completed, and switches 30 and 40 have changed state to connect terminals 34 and 44, respectively, to transmitter 26 and generator 24. Again, responsive to a pulse of signal *c*, scanning generator 24 begins generating vertical and horizontal signals for the scanning of another field. These signals are directed by switch 40 to camera tube 16 which has been exposed to optical image 2″ filtered by red filter segment 56R. Tube 16 is connected in a well-known manner to scan from bottom to top. As signals for the scanning of a first horizontal line near the bottom of the face of camera tube 16 are received, filter segment interface 66 moves into coincidence with the portion of optical image 2″ focused on that part of the face of tube 16. Like tube 14, each horizontal line of tube 16 is scanned as interface 66 is approximately coincident with it during field scanning interval $\tau<t<2\tau$. During this interval video signals, representative of the red components of subject image 2, from tube 16 are channeled by switch 30 to transmitter 26.

During the next field scanning interval, i.e., $2\tau<t<3\tau$, camera tube 14, which has been exposed to image 2′ filtered by green filter 52G, is scanned as filter segment interface 62 passes in front of it. Thus after three field scanning intervals, at $t—3\tau$, blue, red, and green fields have been scanned. Transmitted one after the other by transmitter 26, they form a three-color, field-sequential video signal.

Advantageously, extended camera tube exposure time to scanning time is achieved by the instant invention. Consider the last horizontal scanning line of tube 14. That line, near the bottom of the face of the tube, is first exposed to a green filtered portion of optical image 2′ at time $t\cong\tau$. This last line has just been scanned for the blue filtered image and filter segment interface 61 has just reached the position shown in FIG. 2B. Scanning of camera tube 14 does not begin again until $t=2\tau$, scanning signals being diverted to tube 16 in the time interval $\tau<t<2\tau$. The scanning of the last horizontal line of tube 14, however, does not occur again until time $t=3\tau$. This last horizontal line of tube 14 is therefore exposed to a green filtered portion of image 2′ for a time equal to two scanning intervals, i.e., $2\tau$, before it is scanned to produce a green video signal. The same exposure time exists for all horizontal lines, or any other image portion, on both tubes. Since the scanning time equals $\tau$, exposure time has been doubled relative to scanning time.

Figure 4:
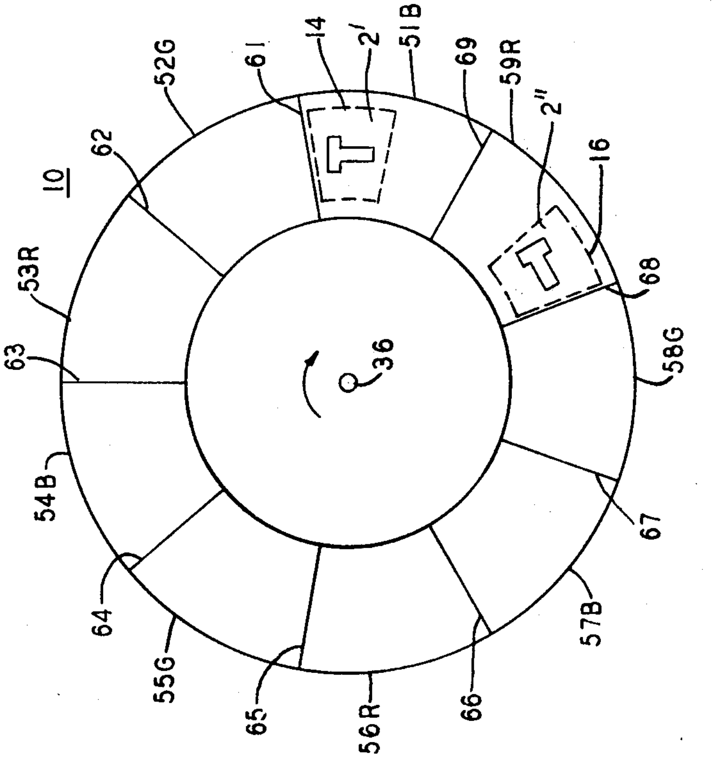
FIG. 4 depicts another arrangement of the camera tubes and the filter wheel of FIG. 2A in accordance with this invention.

Many other arrangements employing a filter wheel may be used in this invention. FIG. 4, for example, discloses another arrangement of camera tubes 14 and 16 behind the filter wheel of FIG. 2. Camera tube 14 is in the same position relative to the filter wheel that it had in FIG. 2. Camera tube 16, however, has been moved from its location behind filter segment 56R in FIG. 2 to a position behind filter segment 59R in FIG. 4. In this embodiment it is necessary to rotate optical image 2″ 60° relative to image 2′ in order to realize compatible horizontal scanning of image 2″. This may be accomplished in any of several well-known ways. For example, a fiber optical device may be included in optical image rotator 8. The filter wheel itself may also be changed as long as the essential relationships between camera tube and filter segment sizes and between field scanning time and filter wheel angular velocity are maintained.

Figure 5:
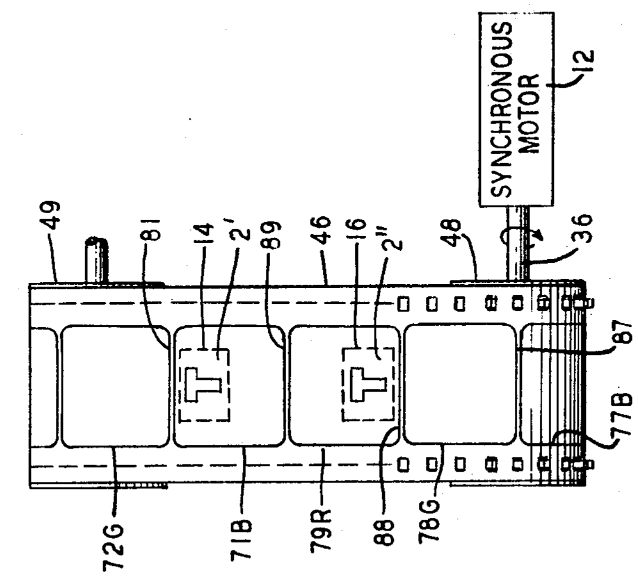
FIG. 5 shows a color filter filmstrip and two camera tubes for use in the system of FIG. 1.

It is to be understood that the embodiments shown and described herein are illustrative of the principles of this invention only, and that modifications may be implemented by those skilled in the art without departing from the spirit and scope of the invention. For example, several equivalents for the filter wheel are known. One such equivalent is a closed loop of film as shown in FIG. 5. The arrangement of camera tubes 14 and 16 behind color filter segments 71B and 79R, respectively, is analogous to the arrangement of the tubes in FIG. 4. The filter filmstrip of FIG. 5, however, has the advantage that rotation of image 2″ is not required. In the case of the filmstrip, moreover, the motion of the filter segments and their interfaces is purely translational relative to the faces of tubes 14 and 16. Coincidence of the filter segment interfaces and the horizontal tube scanning lines is therefore more accurately realized.

Figure 6:
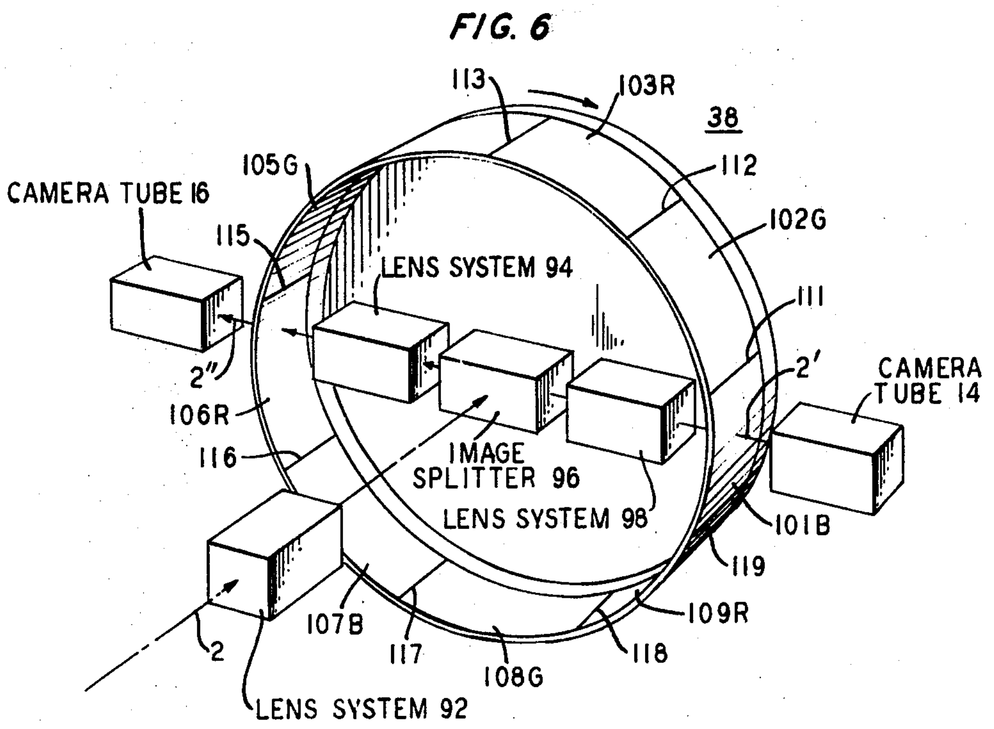
FIG. 6 is a perspective block diagram of a color filter drum for use in the system of FIG. 1.
Figure 7:
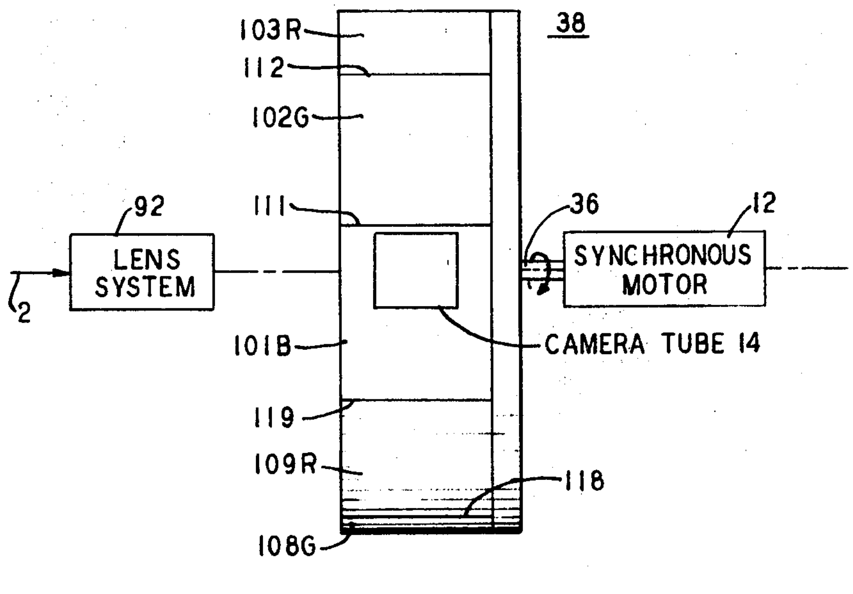
FIG. 7 is a side view of the color filter drum of FIG. 6.

Another possible equivalent for filter wheel 10 is the filter drum of FIGS. 6 and 7. The filter drum shown has only one planar face, at the rear of the drum as shown in FIG. 6. The front of the drum is open to admit light from image 2 and to allow for the structural support of lens systems 94 and 98 and image splitter 96 in the fixed positions shown. As shown in FIG. 7, filter drum 38 may be driven by synchronous motor 12 connected to its rear planar surface by shaft 36. The spatial arrangement of camera tubes 14 and 16 relative to the filter drum of FIG. 6 is analogous to the arrangement of the camera tubes relative to the filter wheel shown in FIG. 2. As in the embodiment in FIG. 2, image 2″ must be focused on tube 16 in inverted relation to image 2′ focused on tube 14. The filter drum is like the filmstrip in that the motion of the filter segment interfaces is translational relative to the faces of tubes 14 and 16.

What is claimed is:

1. Apparatus for generating a three-color, field-sequential television signal of an optical image comprising:

optical color filter means comprising an ordered series of adjoining color filter segments in each of three primary colors for color filtering said optical image;

first and second television camera tubes for developing video signals spatially arranged such that each tube is simultaneously exposed to a different color filtered optical image;

means for impelling said series of color filter segments such that the colors of said color filtered images on the faces of said tubes change at a predetermined rate;

means for alternately scanning each of said camera tubes in a time fractionally related to the time any point on the face of said tube is exposed to a color filtered image of a particular color; and means for selectively combining video signals developed by said camera tubes to generate said three-color, field-sequential video signal.

2. The apparatus of claim 1 wherein said color filter means comprises an ordered series of adjoining color filter segments arranged around the periphery of a filter wheel.

3. The apparatus of claim 1 wherein said color filter means comprises an ordered series of adjoining color filter segments arranged longitudinally on a closed loop filmstrip.

4. The apparatus of claim 1 wherein said color filter means comprises an ordered series of adjoining color filter segments arranged about the cylindrical surface of a drum.

5. Apparatus for generating a three-color, field-sequential television signal of an optical image comprising;:

color filter means for color-filtering said optical image;

first and second television camera tubes for developing video signals spatially positioned such that each tube is simultaneously exposed to a different color-filtered optical image transmitted by said color filter means;

means for altering the colors of said tubes at a predetermined rate;

means for alternately scanning each of said camera tubes; and means for selectively combining video signals developed by said camera tubes to generate said three-color, field-sequential video signal.

6. Apparatus for generating a three-color, field-sequential television signal of an optical image comprising:

color filter means comprising a plurality of adjacent color filter segments in each of three primary colors for color filtering said optical image;

first and second television camera tubes for developing video signals spatially arranged such that each tube is simultaneously exposed to a different color filtered optical image;

means for impelling said series of color filter segments such that the colors of said color-filtered images focused on the faces of said tubes change at a predetermined rate;

means for alternately scanning each of said camera tubes in a time fractionally related to the time any point on the face of said tube is exposed to a color-filtered image of a particular color, the scanning of each of said tubes synchronized to begin when an interface between two of said color filter segments is coincident with the portion of said optical image focused on the part of the face of said tube first to be scanned and further synchronized to end when said interface is coincident with the portion of said optical image focused on the part of said tube last to be scanned; and means for selectively combining video signals developed by said camera tubes to generate said three-color, field-sequential video signal.

7. Apparatus for generating a three-color, field-sequential signal of an optical image comprising:

first and second monochrome television camera tubes for developing video signals;

means for focusing said optical image on the faces of said tubes;

color filter means comprising an ordered series of adjoining color filter segments in each of three primary colors situated between said focusing means and said camera tubes for color filtering said optical images focused on the faces of said camera tubes;

means for imparting motion to said series of color filter segments such that the colors of said color optical images change with time;

means for alternately scanning said camera tubes; and means for selectively combining video signals developed by said camera tubes to generate said three-color, field-sequential video signal.

8. The apparatus defined in claim 7 wherein the dimension of each of said color filter segments measured between its interfaces with adjoining filter segments is twice the vertical dimension of said optical image measured in the plane of the intersection of said color filter segments and said optical image.

9. The apparatus defined in claim 8 wherein said motion is such that an interface between two of said color filter segments passes through one of said optical images in the time required to scan one of said tubes.

10. The apparatus defined in claim 9 wherein said camera tubes are arranged so that the images focused on their faces are filtered through the opposite extremes of two adjacent filter segments.

11. The apparatus defined in claim 10 wherein the scanning of each of said tubes is synchronized to begin when an interface between two of said color filter segments is coincident with the portion of the optical image focused on the part of said tube first to be scanned.